INVENTORS
Jerome J. Kurland
Joseph J. Kurland
BY
Mann, Brown and Hansmann
Att'ys INVENTORS
Jerome J. Kurland
Joseph J. Kurland
BY
Mann, Brown and Kaufmann
Attys INVENTORS
Jerome J. Kurland
Joseph J. Kurland
BY
Mann, Brown and Hansmann
Att'ys INVENTORS
Jerome J. Kurland
Joseph J. Kurland
BY
Mann, Brown and Hardman
Att'ys INVENTORS
Jerome J. Kurland
Joseph J. Kurland
BY
Mann, Brown and Hansmann
Att'ys Nov. 3, 1953 J. J. KURLAND ET AL 2,658,141

TIME DELAY CIRCUITS

Filed Jan. 20, 1951 9 Sheets-Sheet 6

INVENTORS
Jerome J. Kurland
Joseph J. Kurland
BY
Mann, Brown and Hausmann
Att'ys INVENTORS.
Jerome J. Kurland
BY Joseph J. Kurland
Mann, Brown and Hansmann
Att'ys INVENTORS
Jerome J. Kurland
Joseph J. Kurland
BY
Mann, Brown and Hausmann
Attys Nov. 3, 1953 J. J. KURLAND ET AL 2,658,141

TIME DELAY CIRCUITS

Filed Jan. 20, 1951 9 Sheets-Sheet 9

INVENTORS.
Jerome J. Kurland
Joseph J. Kurland
BY
Mann, Brown and Hansmann
Att'ys Patented Nov. 3, 1953

2,658,141

UNITED STATES PATENT OFFICE 2,658,141

TIME DELAY CIRCUITS

Jerome J. Kurland and Joseph J. Kurland, Chicago, Ill.

Application January 20, 1951, Serial No. 207,039

18 Claims. (Cl. 250—27)

This application is a continuation-in-part of our earlier application Serial No. 503,520, filed September 23, 1943, now abandoned.

The general object of our invention is to provide a family of circuits, the members of which may be readily adapted to solve various problems involving delayed action or involving predetermined sequential action in time cycles, especially such problems requiring adjustability in the duration of time periods.

Underlying all the forms of our invention is the broad concept of setting up an initial distribution of potential in a timing or control circuit, causing a shift in the distribution in a predetermined progressive manner over a time period thereby progressively changing the potential in a portion of the circuit over the time period, and causing some desired action to occur in the response to the establishment of a predetermined potential value in said circuit portion. In some forms of the invention this circuit serves not only as a timing circuit but also as an actuating circuit for direct operation of some device; while in other forms of our invention the broadly defined circuit serves as an auxiliary circuit for controlling some other circuit or for controlling a plurality of other circuits in predetermined time sequence.

Some practices of our invention are directed particularly to the problem of achieving precision in the determination of the point in the progressive shift of potential distribution at which some desired action is to occur. This objective is achieved by incorporating in the broadly defined timing circuit some form of current-blocking means, for example, some form of gap means, whereby current flow through the circuit is blocked for an initial period of shift in potential distribution and at the desired moment is released to accomplish the desired action, the release being in response to the attainment of a predetermined potential difference across the current-blocking means, or by some other criteria, such, for example, as the level of illumination on a photosensitive material.

One object sought in several practices of our invention is to provide the broadly defined timing circuit in such form that the circuit may be operatively associated with one or more electronic tubes to attain various delay actions and/or successive actions in predetermined time sequence. The end sought may be, for example, to effect an electronic tube early in the progressive shift of potential distribution in the timing circuit, or to affect an electronic tube late in the shift, or to affect a plurality of tubes in time sequence in the course of the potential shift, or to affect an electronic tube to precipitate one desired action and subsequently to employ the current in the timing circuit itself to cause a second desired action after a predetermined time interval. An important feature of our invention is that a gap means may be incorporated in the broadly defined timing circuit not only to attain precision in the timing of an action, as heretofore pointed out, but also to make possible these various cooperative relationships between the broadly defined timing circuit and one or more electronic tubes. Thus a progressive change in potential in the time circuit on one side of the gap means may shift the grid voltage of an electronic tube to a critical value before the progressively changing potential reaches a magnitude to cause current to jump the gap means and thereby precipitate a second desired action in predetermined time relation to the first action.

The control of a gaseous tube such as a thyratron by an auxiliary timing circuit for predetermined momentary current flow through the plate circuit presents special difficulties since the grid of a thyratron may be employed to "trigger" the tube but is not thereafter effective to cut off current flow. Our timing circuit incorporating a gap means has a peculiar advantage for meeting the problem of thyratron control since the progressively rising potential on one side of the gap means may be used to "trigger" the thyratron and the subsequent current flow across the gap means occuring after a time interval may be used to open a switch means in the plate circuit of the thyratron. As will be made apparent hereinafter, the delayed point in a time cycle at which the thyratron is triggered and the further delayed point at which the plate flow is cut off both may be predetermined and each may be varied independently.

Some embodiments of our invention are directed to certain improvements in the timing circuit itself, various objects being obtained by various specific timing circuits. In our preferred timing circuits a condenser is charged in opposition to an electromotive force in the timing circuit to initially make the electromotive force ineffective and the timing condenser is progressively discharged to make the electromotive force progressively effective thereby causing the desired shift in potential distribution in the timing circuit. Among the various objects attained in such specific forms of our timing circuit are: to provide a timing circuit in which a time cycle may be initiated without the necessity of a switch in the timing circuit itself, the cycle being initiated merely by removing or cutting off a charging source; to provide a timing circuit in which the timing condenser initially holds in abeyance a plurality of electromotive forces so that progressive decay of the condenser charge makes the plurality of electromotive forces progressively effective for a plurality of functions in predetermined time sequence; and to provide a flexible timing circuit in which either the magnitude of the electromotive force or the magnitude of the opposed timing charge or the magnitude of both may be independently varied for accurate control over a wide range of time periods.

One line of development relates to the combination with our flexible timing circuit of a complementary charging device, the object being to incorporate in the charging device adjustability in the setting of the timing action of the circuit over a relatively wide range of time values. A feature of this line of development is the concept of so varying the magnitudes of the electromotive force and the opposed condenser charge in different subdivisions of the time range as to achieve accuracy in the individual subdivisions. Our object here is to solve the problem of meeting the requirements for accuracy peculiar to the individual subdivisions of the time range and yet to correlate the modes of adjustment in the subdivisions for continuous adjustment from one end of the time range to the other.

The above and other objects and advantages of our invention will be apparent in our more detailed description of the invention taken with the accompanying drawings.

In the drawings, which are to be regarded as merely illustrative:

Figure 4A:
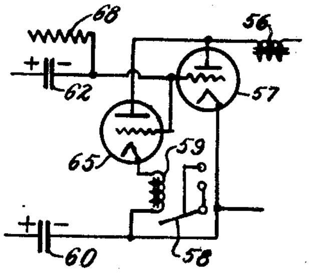
Fig. 4 is a wiring diagram showing a second form of timing circuit operatively associated with an electronic tube.
Figure 4B:
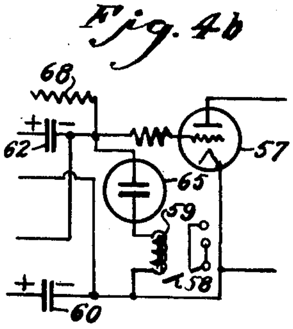
Figure 4:
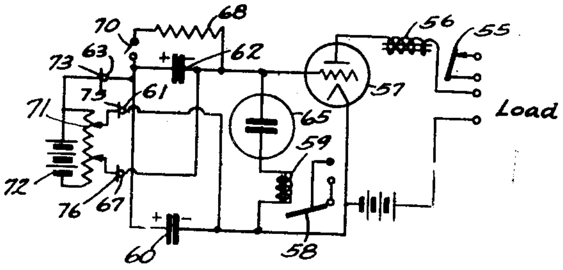
Figure 5:
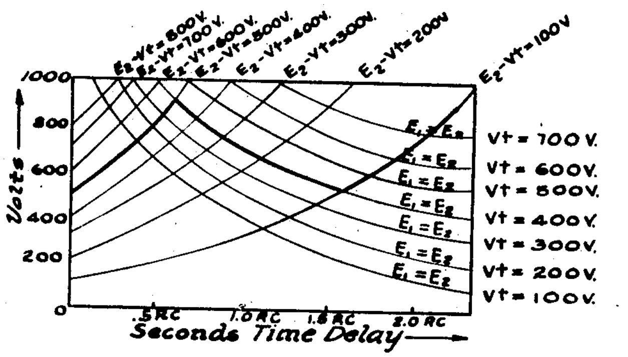
Figure 6:
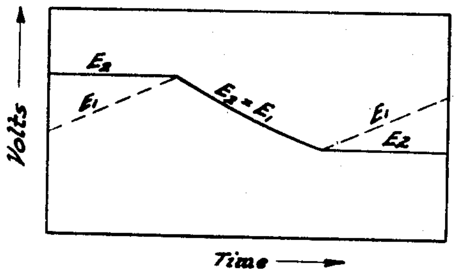
Figure 7:
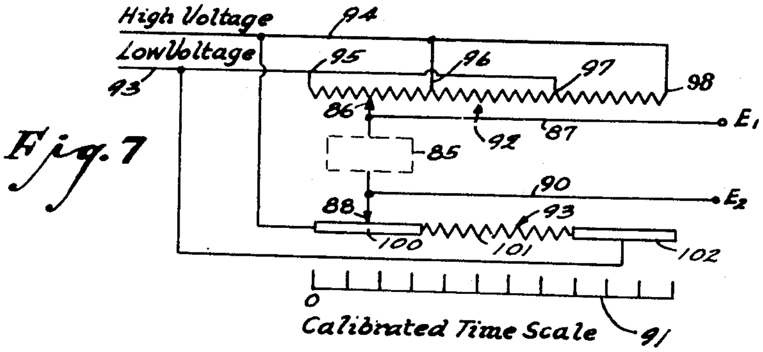
Figure 8:
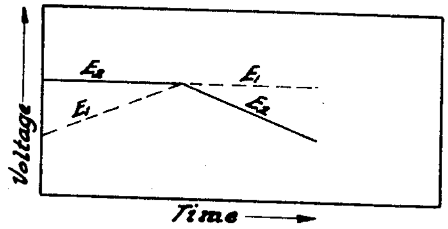
Figure 9:
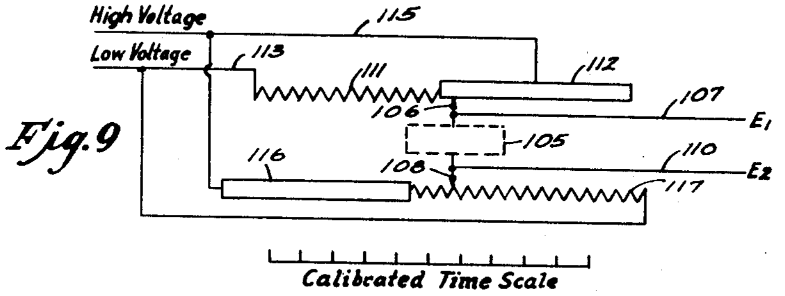
Figures 10, 11:
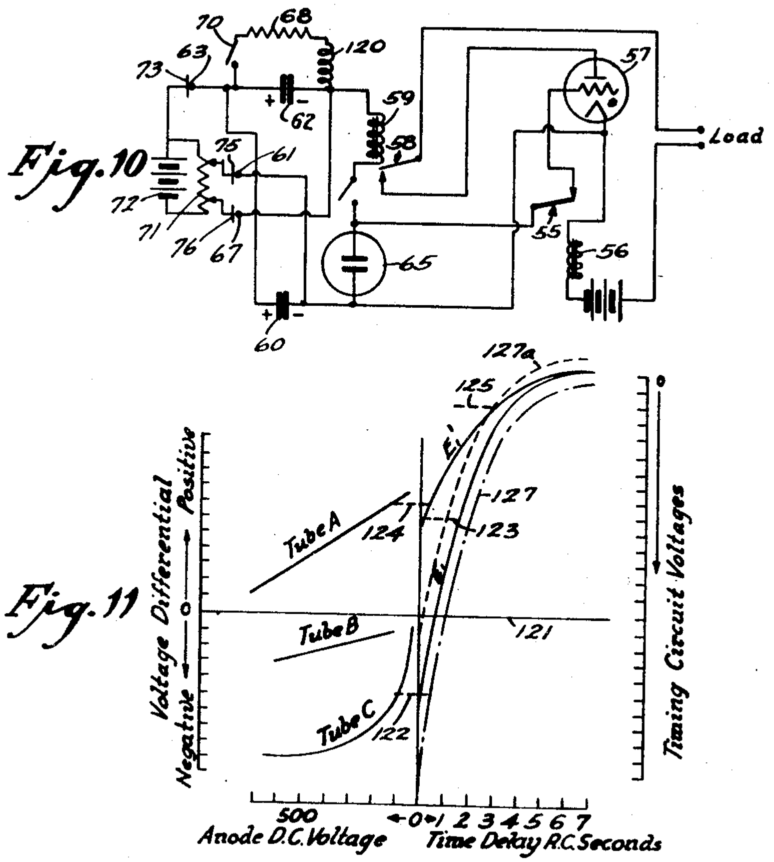
Figure 12:
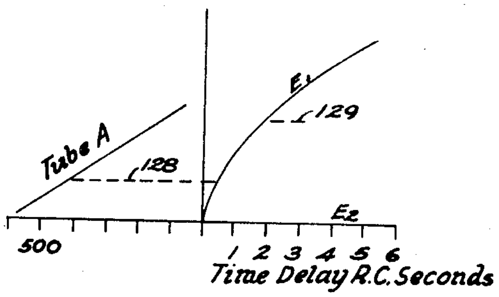
Figure 13:
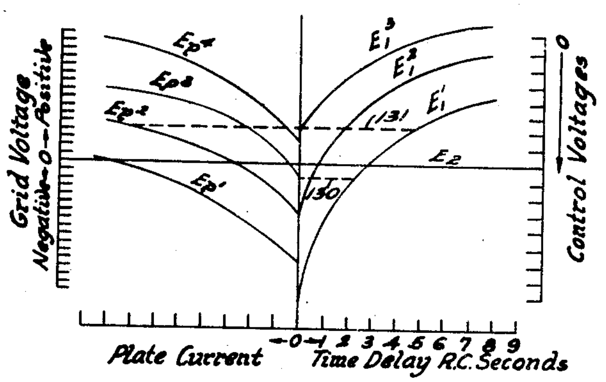
Figure 14:
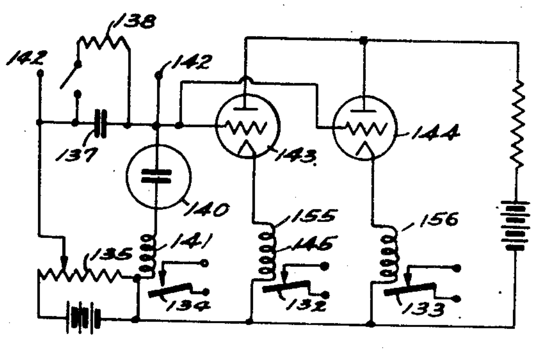
Figure 15:
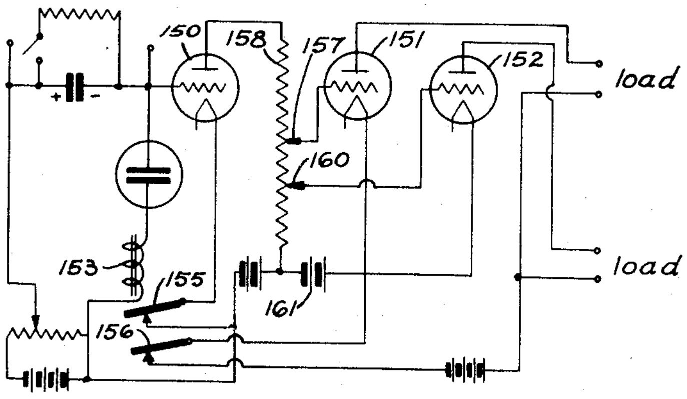
Figure 21:
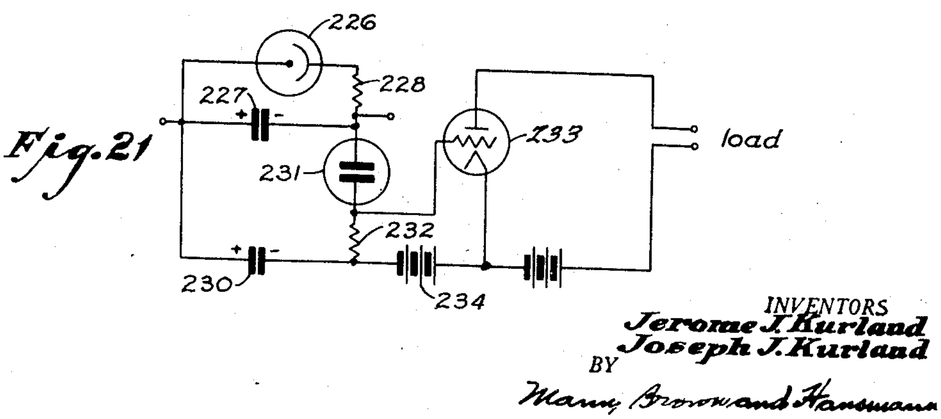
Figure 22:
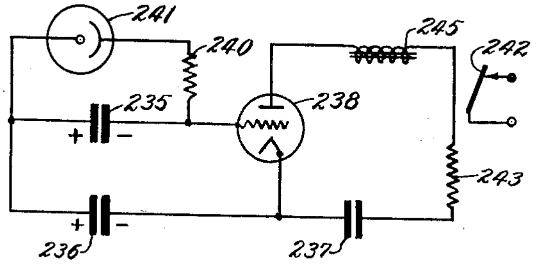
Figure 23:
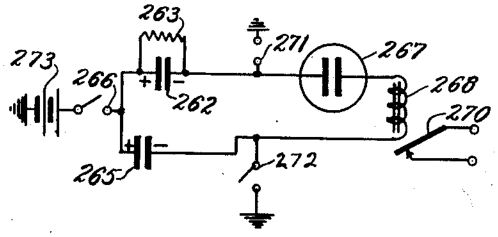
Figure 24:
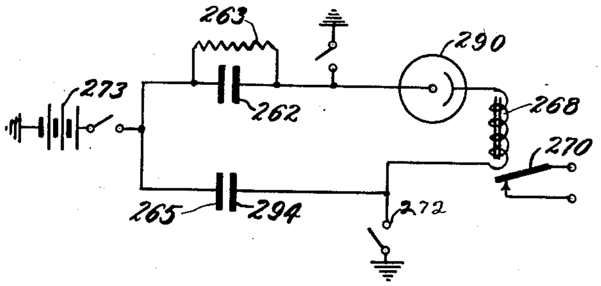
Figure 25:
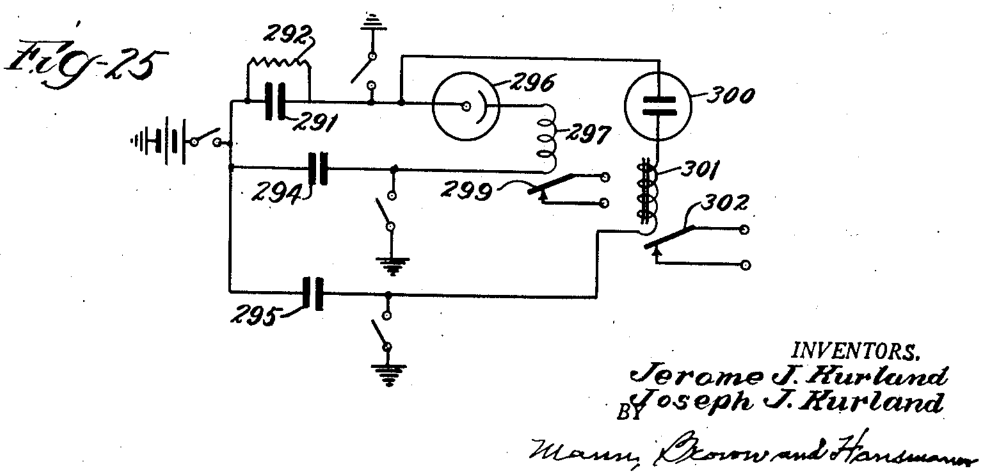
Figure 26:
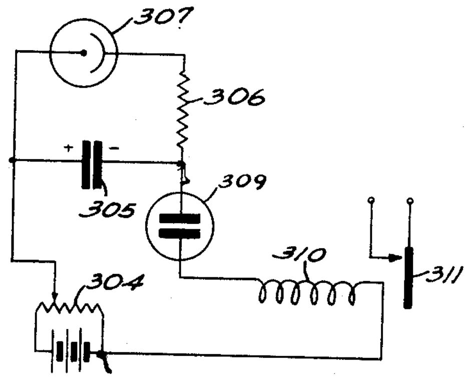
Figure 27:
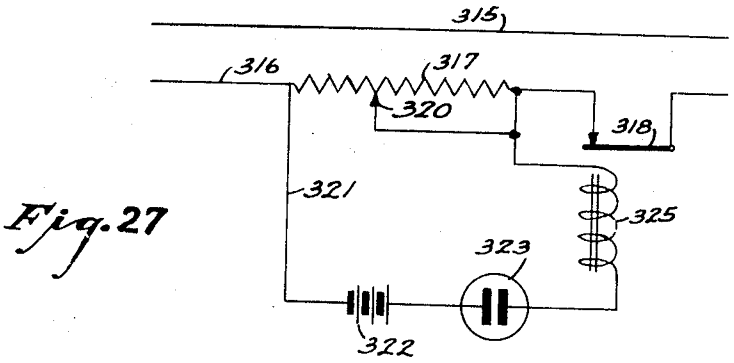
Figure 28:
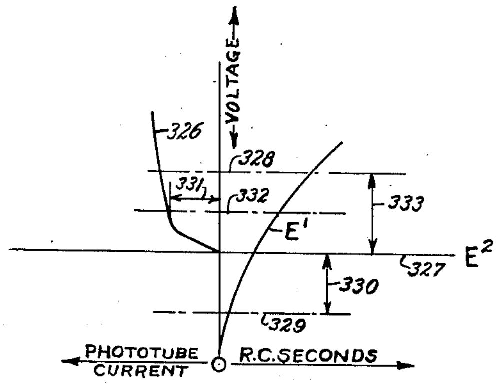
Figure 29:
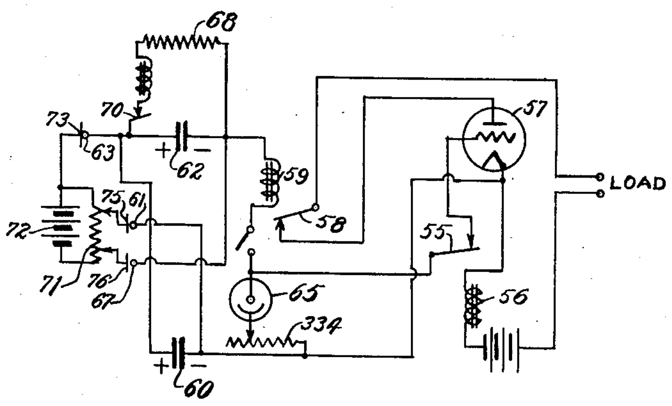
Figure 30:
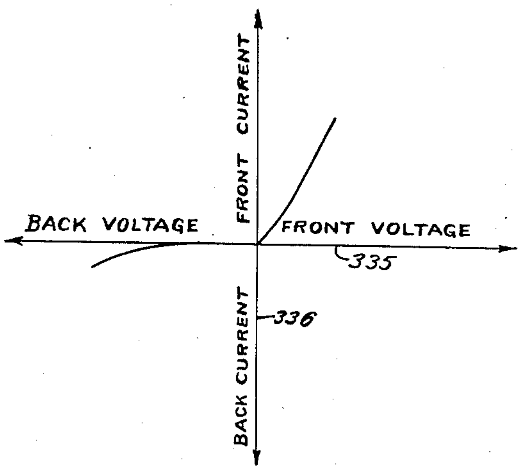

Fig. 4*a* is a partial wiring diagram showing how a triode may be used as a gap means in the circuit of Fig. 4;

Fig. 4*b* is a partial wiring diagram showing how a resistance may be placed in the grid circuit to lessen the effect of grid current in the timing cycle;

Figs. 5 and 6 are graphs explaining several relationships considered in the design of an adjustable charging device;

Fig. 7 is a diagram indicating the construction of an adjustable charging device based on relationships shown in Figs. 5 and 6;

Fig. 8 is a graph indicating relationships involved in a second form of adjustable charging device;

Fig. 9 is a diagram indicating the construction of the second form of adjustable charging device;

Fig. 10 is a wiring diagram of another arrangement in which a timing circuit is operatively associated with an electronic tube;

Figs. 11, 12 and 13 are graphs indicating certain relationships and principles involved in combining a timing circuit with an electronic tube;

Figs. 14 and 15 are wiring diagrams to illustrate how our timing circuit may be employed for sequential control of a plurality of electronic tubes;

Figs. 16–20 illustrate various ways in which our timing circuit may be cooperatitvely associated with an electronic tube;

Figs. 21 and 22 indicate how a photoelectric cell may be incorporated in our timing circuit for useful ends in controlling one or more electronic tubes;

Figs. 23 and 24 are wiring diagrams showing how our timing circuit may be designed to function not only as timing means but also as self-contained actuating means;

Fig. 25 shows what may be termed a dual control circuit designed for both time control and direct actuation;

Fig. 26 shows another circuit applying a photoelectric cell;

Fig. 27 is a wiring diagram illustrating how the principal elements of our timing circuit may be employed for an auxiliary circuit responsive to changes of current in a main circuit;

Fig. 28 is a graph showing certain relationships involved in the use of a photoelectric cell in our timing circuit;

Fig. 29 indicates how a photoelectric cell may be incorporated in our timing circuit for operative association with an electronic tube; and Fig. 30 is a graph showing certain relationships of a particular gap means useful in certain of our timing circuits.

As heretofore stated, our preferred form of the broadly defined timing circuit includes means providing a first electromotive force and a charging condenser to provide an opposed second electromotive force to initially make the first electromotive force ineffective. A means for providing the first electromotive force may be selected from a number of devices in the art including generators, batteries, potentiometers, etc.

Figure 1:
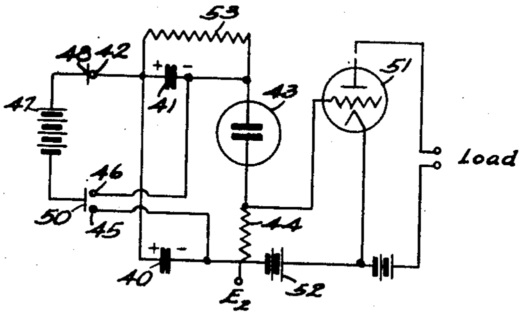
Figure 1 is a wiring diagram showing our timing circuit associated with a grid-controlled electronic tube.

In Fig. 1 the means for providing the first electromotive force is a condenser 40 which may aptly be termed a tank condenser since, in effect, it serves as a reservoir for an electric charge that is released as a result of decay of an opposed electric charge on a timing condenser 41. The condensers 40 and 41 are connected on their positive potential sides to a common charging contact 42 and on their negative sides are interconnected by a current-blocking means 43 and a resistance 44 placed in series, the current-blocking means 43 being connected to the timing condenser 41 and the resistance being connected to the tank condenser 40. The current-blocking means 43 may be a gap means such as any electrical device which does not conduct current until a predetermined voltage is impressed across the device.

The current-blocking means 43 serves to prevent current flow through the circuit until a predetermined potential difference is established across the electrodes. The gap means may be either bidirectional or unidirectional, but ordinarily a unidirectional gap means is preferred for reasons that will later appear.

For charging the timing circuit in Fig. 1 preliminary to a time cycle, the negative side of the tank condenser 40 is shown connected to a charging contact 45 and the negative side of the timing condenser 41 is shown connected to a charging contact 46. For cooperation with the timing circuit, we may employ any suitable charging device. In Fig. 1 we show diagrammatically a charging device in which the positive side of a battery 47 is connected to a contact 48 adapted to touch the circuit-charging contact 42 and the negative side of the battery is connected to a contact 50 adapted to touch simultaneously both the charging contacts 45 and 46 of the circuit It will be obvious to those skilled in the art that the two condensers and the charging battery may all be reversed in polarity if such reversal is advantageous in any particular application of the timing circuit.

The timing circuit in Fig. 1 is operatively associated with a grid-controlled electronic tube 51 which tube in various practices of the invention may be various types of vacuum tubes or various types of gaseous tubes. The grid of the electronic tube 51 is connected to the timing circuit between the gap means 43 and the resistance 44 while the plate circuit of the electronic tube is connected on the cathode side to the timing circuit at a point between the resistance 44 and the tank condenser 40, the connection being made through a grid-biasing battery 52.

Such a timing circuit may be employed either to start or to stop current flow through the plate circuit of the tube 51. In the present example the timing circuit is designed to start flow through the plate circuit of the tube at the end of a predetermined delay period. To start the desired delay interval, some means is provided to progressively discharge the timing condenser 41 at a predetermined rate thereby to make the charge on the tank condenser 40 effective at a predetermined rate to build up a potential difference across the gap means 43, the time interval being terminated by the breakdown of resistance to flow across the gap means.

The means for progressively reducing the charge on the timing condenser 41 at a predetermined rate may comprise a suitable resistance 53 for shunting the timing condenser together with a suitable switch for opening and closing the shunt circuit. Fig. 1 exemplifies the fact that it is not necessary, however, to provide a switch means in the timing circuit itself to make the shunt resistance across the timing condenser effective for initiating a time period. So long as the charging means represented by the battery 47 is maintained in continuous communication with the three charging contacts, 42, 45 and 46 of the timing circuit, the required charge will be maintained on the timing condenser 41 notwithstanding current leakage from the timing condenser through the shunt resistance 53. The timing period may be initiated by merely breaking communication between the charging means and the timing circuit, for example, by simply removing the charging means, whereupon the continued leakage of current through the resistance 53 becomes effective to progressively reduce the charge on the timing condenser. This arrangement then teaches that a shunt switch in our timing circuits may be eliminated if desired.

In this particular embodiment of our invention the delay interval terminates when current flows across the gap means 43 thereby producing a potential drop along the resistance 44 to shift the grid bias of the tube 51 in one direction past or at least to the minimum grid voltage for current flow through the plate circuit of the tube. Since the present arrangement is intended to initiate flow through the plate circuit rather than to stop flow, the grid voltage is shifted in the positive direction relative to the cathode of the tube. The potential drop across the resistance 44 counteracts the normal biasing effect of the grid battery 52.

In the arrangement shown in Fig. 1 variation in the time cycle may be accomplished either by substituting one gap means for another or by varying the potential to which the condensers are charged in preparation for a time cycle. Preferably, variation in the time cycle will be produced by adjusting the potential of the charging means.

Figure 2:
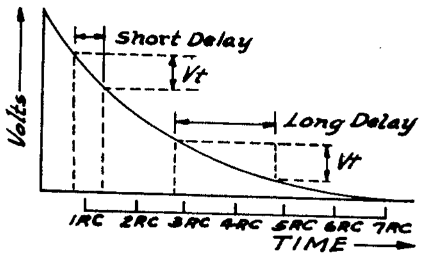
Figs. 2 and 3 are graphs explaining certain relationships involved in certain practices of our invention.

Fig. 2 shows a curve representing the rate at which the charge on the timing condenser 41 decays by reason of current flow through the shunt resistance 53. The two condensers 40 and 41 are, of course, initially charged equally to any value on this curve, the potential across the tank condenser remaining constant while the potential across the timing condenser decreases in accord with the curve. $V_t$ represents the minimum potential difference across the gap means in the timing circuit at which current will be caused to jump the gap thereby initiating current flow through the timing circuit as a whole. For a relatively short delay period the two condensers are charged to a relatively high voltage and for longer delay periods are charged to lower voltages as indicated in Fig. 2.

One limitation in the use of the above described timing circuit that becomes apparent upon study in Fig. 2 is that an exceedingly small time delay can be obtained only by using an exceedingly high initial charging voltage. Another limitation is that the charging voltage must be lowered excessively to result in an exceptionally long delay period, the undesirable consequence being that for long delay intervals the timing circuit must be operated at a relatively low energy level.

These limitations can be avoided by charging the two condensers differentially. For convenience, any timing circuit arrangement wherein the two opposed electromotive forces are initially equal may be referred to as a simplex circuit and any circuit arrangement providing for different initial values of the opposed electromotive forces may be referred to as a duplex circuit.

Figure 3:
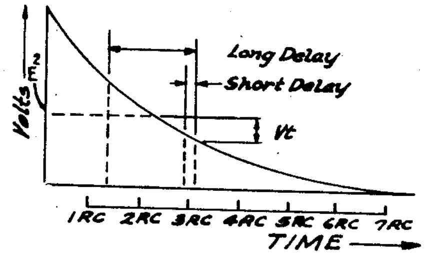

The advantages of a duplex circuit may be understood by referring to Fig. 3 in which $E_2$ represents an unvarying voltage applied to the tank condenser and the curve of voltage decay represents a range through which the timing condenser may be initially charged, the decreasing voltage of the timing condenser conforming to the curve in the course of the timing cycle. It is apparent that with a given striking voltage $v_t$ for the gap means in the timing circuit, a relatively short delay period will result from making the potential of the initial charge on the timing condenser less than $E_2$ by an amount slightly less than $v_t$. For a relatively long delay period, the initial charge on the timing condenser would be higher than the voltage $E_2$. It is clear that a duplex circuit provides a greater range of time adjustment than a simplex circuit without the necessity of dropping to undesirably low energy levels for relatively long delay periods.

For a long time delay in a duplex circuit it is necessary for the potential on the timing condenser to exceed $E_2$. If a bidirectional gap means is used, the highest value of the timing condenser voltage is limited, since the gap means would break down and conduct current when this voltage exceeded $E_2$ by the striking voltage $V_t$. A unidirectional gap means eliminates this limitation, and is therefore preferred.

Fig. 4 is an example of a duplex circuit, i. e. a circuit providing for opposed electromotive forces of unequal values. Fig. 4 is also an example of a timing circuit so related to an electronic tube as to exercise control over the plate circuit of the tube prior to current flow across the gap means in the timing circuit. A very important feature of such an arrangement as exemplified in Fig. 4 is that the plate circuit of the electronic tube may control a first action to occur at a predetermined point in a time cycle and the flow of current through the timing circuit incidental to striking across the gap means may precipitate a second action in the time cycle after a predetermined time interval.

In Fig. 4 the first action is represented by a relay 55 having its coil 56 in the plate circuit of an electronic tube 57, and the second action is represented by a relay 58 having its coil 59 in the timing circuit associated with the electronic tube. In the timing circuit of Fig. 4 the potential sides of a tank condenser 60 and a timing condenser 62 are connected to a common charging contact 63 and the negative sides of the two condensers are interconnected by a gap means 65 and the relay coil 59 arranged in series, the gap means being connected to the timing condenser 62 and the relay coil being connected to the tank condenser 60. The negative side of the tank condenser 60 is connected to a charging contact 61 and the negative side of the timing condenser 62 is connected to a charging contact 67. The shunt circuit for progressive discharge of the timing condenser 62 includes not only a resistance 68 but also a normally open shunt switch 70.

After the two condensers are charged by a suitable charging device with the switch 70 open, the charging device may be removed and the time cycle initiated subsequently whenever desired by simply closing the shunt switch 70. During the progressive decrease of the charge on the timing condenser 62 caused by current flow through the shunt resistance 68, the potential across the timing condenser 62 decreases to progressively change the potential difference across the gap means. During this progressive shift of potential across the gap means 65, the consequent shift in potential of the grid voltage of the tube 57 reaches the minimum grid voltage for flow through the plate circuit of the tube thereby either cutting off plate flow or initiating plate flow as may be desired by the designer of the circuit arrangement. In this instance it is assumed that the grid voltage is shifted in a direction to initiate flow in the plate circuit, the normal grid voltage prior to initiation of the time cycle being sufficiently negative relative to plate circuit to preclude current flow. The required grid bias is obtained by charging the timing condenser 62 to a higher voltage than the tank condenser 60 with the polarities shown in Fig. 4.

Sometime after the progressive change in potential across the timing condenser 62 passes the point at which current flow is initiated in the plate circuit of the tube, the potential difference across the gap means reaches a value to permit current flow through the timing circuit with consequent operation of the relay 58. Obviously the relays 55 and 58 may be normally open or normally closed and may perform various functions in various applications of the invention.

In Fig. 4 the means for differentially charging the two condensers is indicated only diagrammatically and is shown for the sake of simplicity as including a voltage divider 71 across a charging battery 72 with the positive pole of the battery connected to a contact 73 adapted to touch the charging contact 63. Movable along the voltage divider 71 are two independently adjustable contacts that are connected respectively with a contact 75 and a contact 76, these two contacts being adapted to touch the charging contacts 61 and 67 respectively of the timing circuit.

Fig. 1 provides a circuit, which has a single time interval, since it can control the time between removing the charging means and initiating plate current flow in the tube 51. Fig. 4 provides a circuit for a double time interval since it can control the time between closing switch 70 or removing the charging means, whichever the case may be, and initiating the flow of plate current in tube 57 as well as the time between initiating the plate current flow and actuating the relay 58 by the conduction of gap means 65.

The basic difference between Fig. 1 and Fig. 4 lies in where the grid of the electronic tube is connected to the timing circuit. In Fig. 1 the grid of tube 51 does not have the voltage differential between the timing and tank condenser voltages impressed as a bias voltage until the gap means conducts current, while in Fig. 4 the grid of the tube 57 has at all times the voltage differential of condensers 40 and 41 impressed as a bias voltage. This means that in Fig. 1 the algebraic sum of the series bucking voltages on condensers 40 and 41 does not appear as a grid bias voltage until the gap means 43 conducts current, while in Fig. 4 the algebraic sum of the series bucking voltages on condensers 60 and 62 does appear as a grid bias voltage at all times during the operation of the timing circuit.

If the grid of an ordinary electronic tube is made appreciably positive with respect to the cathode grid current will flow. Since in Figure 4 the voltages across the condensers 60 and 62 are connected in series with the external grid to cathode circuit and their voltages are opposite in polarity, the voltage across timing condenser 62 cannot be appreciably below that of the voltage on the tank condenser 60 without causing grid current to flow. This grid current would act to reduce the voltage differential between the timing condenser voltage and the tank voltage, upsetting the timing cycle.

In selecting components for a circuit such as Fig. 4, these facts must be considered. One obvious solution is to provide a gap means which conducts current when the potential across timing condenser 62 is slightly less than the tank voltage, or, in other words, as soon as the grid of tube 57 goes slightly positive. The gap means will conduct and end the timing cycle without the adverse effect of grid current, since grid current is negligible at such low values of positive grid bias. The importance of keeping the grid at a relative low positive potential with respect to the cathode will depend entirely upon the grid current vs. grid voltage (plate voltage constant) characteristic of the tube. The gap means may, therefore, by way of example, be a unidirectional resistance (a very high resistance to one polarity of voltage and a nominal resistance to a reverse polarity), a germanium crystal diode, a rectifier, etc. For any practial range of time periods with reasonable circuit components the gap means should be unidirectional due to the low conducting potential of the gap means utilized to prevent grid current.

As an illustration of the versatility possible in selecting a suitable gap means, the gap means used with the circuit of Fig. 4 could be a triode, as shown for example in Fig. 4*a*, with the grid of the gap means triode connected to the grid of the tube 57, and the cathode of the gap means triode connected to the cathode of tube 57 through the coil 59 of relay 58. The voltage differential between the voltages on condenser 60 and 61 would then apear as a bias voltage on the gap means triode, and the flow of current through the coil 59 would be controlled by the bias on the gap means triode, which in turn is controlled by the condenser voltages. The gap means triode would of necessity have its cutoff bias at a less negative value than the electronic tube 57. By utilizing a less negative cutoff bias on the gap means triode no grid current would be drawn by the electronic tube 57 since the timing cycle would terminate before the grid of the electronic tube 57 became positive. The cut-off bias of the triode gap means could be positive but then the value of the positive bias on the tubes must be kept at a low value.

Other obvious ways to avoid the deleterious effect of grid current in Fig. 4 would be to use a relay in the grid circuit as shown at 55 in Fig. 10, or to employ a high resistance between the grid of tube 57 and the gap means 65, as shown in Fig. 4*b*.

While a charging device of utmost simplicity such as indicated in Fig. 1 may be employed, it is often desirable to use a more elaborate form of charging device for convenience and accuracy whenever it is contemplated that the time interval controlled by the time circuit will be frequently varied over a wide range of time values.

Certain problems are encountered in any attempt to design such an adjustable charging device for utilizing the circuit of Fig. 1 as a duplex timing circuit. For accuracy in time measurement by the duplex circuit the slope of a curve of voltage values plotted with respect to time should be such that given voltage differences represent commensurate differences in time periods. If the curve is too steep, a given change in potential represents an undesirably small change in time; on the other hand, the same change in potential along a flattened curve represents an excessively large change in time.

We have found that for accurate time control different relationships between $E_1$, the timing-condenser charge, and $E_2$, the tank-condenser charge, must be employed in different time ranges. Thus, for accuracy in an initial range of relatively short time periods, $E_2$ must be relatively high, whereas over a range of relatively long time periods $E_2$ must be relatively low. We have further discovered that these two extreme ranges of time changes may be correlated in such a manner as to afford a smooth and gradual progression of time values. One manner of correlating the two extremes of time changes is by introducing a mid range.

The graph in Fig. 5 shows an initial range of relatively small time periods in which $E_2$ is relatively high. Considering Fig. 1 particularly, it may be assumed, by way of illustration, that in a particular duplex circuit the striking voltage $v_t$ of the gaseous tube or gap means is 400 volts and that $E_2$ throughout the initial range is maintained at 900 volts, $E_2$ minus $v_t$ equalling 500 volts. In the mid range of time values $E_2$ substantially equals $E_1$, both diminishing progressively as indicated. Since $E_2$ is constant over the initial range and since $E_2$ substantially equals $E_1$ at the end of the initial range, variation in time over the initial range is produced by variation in the value of $E_1$, $E_1$ being relatively low for nearly instantaneous operation and rising to substantially equal $E_2$ at the end of this initial time range.

In the final range of relatively long time periods, $E_2$ is again held substantially constant at a relatively low value ($E_2$ minus $v_t$ equals 100 v.) and variations in time are again produced by variations in the value in $E_1$. At the start of this final range, $E_1$ substantially equals $E_2$ but with increasing time values over the range, $E_1$ progressively rises above $E_2$.

Fig. 6 shows graphically the relation between the charging voltages $E_1$ and $E_2$ over the three ranges of time adjustment.

In Fig. 7 we indicate diagrammatically how a rheostat arrangement may be employed in a charging device to apply potentials $E_1$ and $E_2$ selectively for any desired value over the three ranges of time. A control member 85 shown in dotted lines carries a first brush or wiper 86 that is connected to a charging contact $E_1$ by a wire 87 and also carries a second brush or wiper 88 that is connected by a wire 90 to a charging contact $E_2$. Movement of the control member 85 with reference to a time scale 91 causes the wiper 86 to traverse a rheostat resistance generally designated 92 and simultaneously causes the wiper 88 to traverse a second rheostat resistance generally designated 93.

The rheosat resistance 92 for controlling potential $E_1$ is divided into three ranges by connection with a low voltage wire 93 and a high voltage wire 94, the ranges corresponding to the previously mentioned initial, mid and final time ranges. The initial time range is defined by a low voltage connection 95 and a high voltage connection 96; the mid range is defined by the high voltage connection 96 and a second low voltage connection 97; and the final time range is defined by the low voltage connection 97 and a second high voltage connection 98. Thus, potential $E_1$ rises progressively as the control member 85 moves to the right until a maximum value is reached at connection 96 whereupon potential $E_1$ drops progressively until contact 97 is reached and finally potential $E_1$ rises to the maximum again at connection 98.

The rheostat resistance 93 comprises a contact 100 extending over the initial time range, a resistance 101 extending over the mid range, and a second contact 102 extending over the final time range. The contact 100, the resistance 101, and the contact 102 are in series, the contact 100 being connected to the high voltage wire 94 and the contact 102 being connected to the low voltage wire 93. By virtue of this arrangement, potential $E_2$ varies in the desired manner as the control member 85 is moved along the time scale 91, the potential $E_2$ being constant at a relatively high voltage and the initial time range progressively decreasing in the mid range and again remaining constant in the final range. It will be noted that the described arrangement causes $E_1$ to equal $E_2$ in the mid range, both values increasing or decreasing synchronously with movement of the control member 85.

The manner in which such a charging device is employed may be readily understood. The operator merely adjusts the operating member 85 for whatever period of time delay is desired, the operator being guided by reference to the time scale 91.

Instead of employing a mid range between the two extreme ranges of time as described above, we may in some practices of our invention omit the mid range and provide for direct correlation by arranging for the values $E_2$ and $E_1$ at the end of the initial range to equal the values of $E_2$ and $E_1$ at the beginning of the final range. The relationship may be understood by referring to Fig. 8. Note that $E_1$ progressively rises towards the relatively high value of $E_2$ over the initial range and that in the final time range $E_1$ is substantially constant while $E_2$ progressively decreases in value.

In Fig. 9 we indicate diagrammatically how a rheostat arrangement may be incorporated in an adjustable charging device to supply potentials $E_1$ and $E_2$ over two time ranges correlated in the manner suggested by Fig. 8.

A control member 105 shown in dotted lines carries a first brush or wiper 106 that is connected to a charging contact $E_1$ by a wire 107. The control member also carries a second brush or wiper 108 that is connected by a wire 110 to a charging contact $E_2$. For cooperation with the contact 106 we show a rheostat means comprising a resistance 111 and an elongated contact 112 in series, the outer end of the resistance 111 being connected to a low voltage lead 113 and the elongated contact being connected to a high voltage lead 115. For cooperation with the contact 108 we show a second rheostat means comprising an elongated contact 116 and a resistance 117 in series, the elongated contact 116 being connected to the high voltage lead 115 and the outer end of the resistance 117 being connected to the low voltage lead 113. It may be readily appreciated that movement of the control member 105 to adjust voltages $E_1$ and $E_2$ for various time intervals will cause the voltages $E_1$ and $E_2$ to vary in value in accord with Fig. 8.

Due to the necessity of eliminating any high positive bias in a circuit of the type of Fig. 4, the charging means of Figs. 7 and 9 are suitable for use over the final range since the two-interval control would be lost if the timing condenser voltage was less than, or equal to, the tank voltage (assuming tube 57 has a negative cutoff bias). If a single interval control is desirable for this type of circuit, the three ranges may be used except that in the first range $E_2$ must not exceed $E_1$ by an amount equal to the striking voltage of the gap means, for if it did, the gap means would fire immediately.

Fig. 10 indicates how the arrangement depicted in Fig. 4 may be adapted to the purpose of causing current flow through the plate circuit of a gaseous tube for a momentary period of predetermined duration after an initial predetermined delay period. In other words, the circuit arrangement shown in Fig. 10 provides for a time cycle in which current flow through the plate circuit of the tube starts at a selected intermediate point in a time cycle and is cut off at the end of the time cycle. It also provides for isolating the grid from the timing circuit as soon as plate current flows.

Since Fig. 10 is largely similar to Fig. 4, corresponding numbers are employed to designate corresponding parts. The positions of the relay coil 59 and the gap means 65 in the timing circuit are shown in reversed order with respect to Fig. 4 but such reversal has no significance so long as the connection between the grid of the tube 57 and the timing circuit is between the gap means 65 and the timing condenser 62. Fig. 10 shows an inductance 120 in series with the shunt resistance 68, which inductance may be added to affect the rate at which voltage decay across the timing condenser is caused by current leakage through the shunt resistance.

The tube 57 in Fig. 10 may be any gaseous tube such as a thyratron with a negative value of cutoff bias. The relay 58 is placed in the plate circuit of the tube to open that circuit in response to current flow across the gap means 65 in the timing circuit. The connection between the grid of the tube and the timing circuit is through the relay 55 so that initiation of plate flow isolates the grid. This isolation eliminates the problem of grid current flow and permits the voltage across timing condenser 62 to fall as much below the tank voltage as desirable to cause the gap means 65 to strike. The necessity of using a gap means with a low striking voltage is eliminated by such isolation.

Rising voltage on the grid of the tube 57 caused by progressive discharge of the timing condenser 62 eventually triggers the thyratron to initiate flow through the plate circuit. Immediately the grid is cut off by opening of the normally closed relay 55, but without effect on the plate circuit. Later, the increasing potential difference across the gap means 65 in the timing circuit reaches the critical value at which the gap is bridged and current then flows through the timing circuit to energize relay coil 59 and thereby open the plate circuit of the tube to terminate the time cycle.

Fig. 11 is a diagram which illustrates certain relationships involved in Fig. 10 and which indicates the flexibility afforded with respect to time adjustment in various applications of the underlying principle. Fig. 11 also suggests how the facts that control time cycles may be represented graphically as a means of approach by a designer confronted with some particular timing problem.

On the left side of Fig. 11 are shown, by way of example, curves of three different gas-filled tubes indicating plate voltages and the corresponding minimum grid voltages required to strike the tubes. In our combination of a timing circuit and a gas-filled electronic tube as exemplified by Fig. 10, the progressive change of the grid voltage in the time cycle is determined by the progressive change in the relative values of the two condenser charges $E_1$ and $E_2$. In Fig. 11, therefore, we express grid voltage as the voltage differential in the timing circuit, the horizontal reference line 121 representing not only zero grid voltage on the tube but also equality of the opposed electromotive forces in the timing circuit. Since it is assumed that the potential $E_2$ on the tank condenser remains constant in the course of a time cycle while the potential $E_1$ on the timing condenser progressively decreases, the reference line 121 also represents the tank condenser potential $E_2$ and may be referred to as line $E_2$.

On the right side of Fig. 11 is plotted a typical voltage-decay curve representing values of the timing condenser voltage $E_1$ plotted with respect to the reference line $E_2$. Since the reference line $E_2$ represents the initial voltage to which the tank condenser is charged, vertical distances between the curve $E_1$ and the reference line $E_2$ represents voltage differentials $E_2$—$E_1$ at progressive stages in a time cycle.

The particular curve of $E_1$ values shown in Fig. 11 represents a case in which the initial potential on the timing condenser at the beginning of a time cycle is higher than the initial potential $E_2$ on the tank condenser. Since the voltage scale on the right of Fig. 11 is inverted, the initial value of $E_1$ is shown below the reference line representing $E_2$. In the course of the timing cycle determined by the voltage decay curve $E_1$, the voltage differential $E_2—E_1$ progressively diminishes numerically from an initial value to zero and then progressively increases numerically to higher than the initial value. Obviously, when a bidirectional gap means is used the striking potential $v_t$ of the gap means in the timing circuit must be greater than the initial differential $E_2—E_1$ but less than some final value $E_2—E_1$ so that current flow in the timing circuit will be blocked at the beginning at the time cycle but will occur at a selected final value of $E_2—E_1$. If a unidirectional gap means is used the striking potential $v_t$ does not need to be greater than the initial differential $E_2—E_1$.

Fig. 11 illustrates the flexibility afforded by the available timing combination in the sense that the designer has ranges of choice in the selection of determining factors. Thus, any of the three indicated tubes or other available electronic tubes may be employed.

As may appear desirable for a timing problem under consideration, relative values of $E_2$ and $E_1$ for beginning a time cycle may be selected within a wide range of values. The character of the decay voltage curve $E_1$ is basically determined by the R–C constant of the timing condenser in the circuit with the shunt resistance. The designer may introduce inductance into the shunt circuit, however, as indicated at 120 in Fig. 10, to change the character of the $E_1$ curve if such change is desirable. Finally, there is choice in the value of the striking voltage $v_t$ of the gap means that serves to terminate the time cycle.

By way of example, let it be assumed that the designer lays out Fig. 11 for a particular timing problem in which it is desired that current flow through the plate circuit of the tube be initiated at 0.5 R–C seconds from the beginning of the time cycle and be terminated 1.5 R–C seconds from the beginning of a time cycle. The dotted horizontal line 122 intercepting the line $E_1$ at the point representing 0.5 R–C seconds also intercepts the curve for tube C at the point representing 100 volts on the tube anode. The designer then selects tube C for operation at 100 volts on the anode. The dotted line 123 intercepting the curve $E_1$ at the time value 1.5 R–C seconds represents a final voltage differential $E_2—E_1$ of a greater magnitude than the initial differential $E_2—E_1$ and indicates the striking voltage for which the gap means in the timing circuit is to be designed.

To give another example, if the duration of the plate current flow is to extend from 0.5 R–C seconds to 3.0 R–C seconds, the designer may use a second curve $E_1'$ in conjunction with tube A, the tube being operated with 100 volts on the anode as indicated by the dotted line 124 and the striking voltage of the gap means being selected in accord with the position of the dotted line 125 measured from the reference line $E_2$.

Tube A requires a positive grid bias to cause plate current flow therethrough. Therefore, the possibility of appreciable grid current must be considered, since the grid is not cut off until plate current flow is initiated. The positive grid bias voltage, which is required to cause plate current flow in tube A, is represented in Fig. 11 by the distance measured between lines 121 and 124. If this grid bias voltage is of such a magnitude to cause an appreciable grid current flow it is likely that the voltage differential, between the tank and timing condenser voltages, will never reach a value to cause tube A to conduct plate current. Therefore, it is necessary in using a tube that requires a positive grid bias to initiate plate current flow to make certain that the positive grid bias required is not high enough to draw appreciable grid current, or if it does, then to provide other means for counteracting it, as will be hereinafter described.

In consideration of Fig. 11 to this point, it has been assumed that all curves representing $E_1$ are based on an unvarying value of $E_2$. If the designer, however, finds that an $E_1$ curve found by this approach is of the desired configuration but is positioned too high or too low with respect to the reference line 121, the designer may simply displace the $E_1$ curve to a desired relative position by simply assuming a new value for $E_2$. Thus in Fig. 11, the dash-dot line 127 represents a downward displacement of the curve $E_1$ accomplished by assuming a lower value for $E_2$, and the dotted line 127a represents an upward displacement of the curve $E_1$, accomplished by assuming a higher value for $E_2$. It should be borne in mind that the voltage scale on the right reads downward. Since the value of $E_2$ represents zero grid voltage on the left side of Fig. 11, it is desirable to consider the curve $E_1$ as displaced relative to $E_2$ rather than actually to shift the line $E_2$ in Fig. 11 to represent the same change in relative values of $E_2$ and $E_1$.

The purpose of Fig. 12 is to indicate how the diagrammatic approach exemplified by Fig. 11 may be employed in designing a simplex timing circuit for a particular time cycle. In a simplex circuit, the tank condenser and the timing condenser are initially charged to the same potential as heretofore explained. Fig. 12, therefore, shows $E_1$ starting at the level of $E_2$. To provide a time cycle in which plate circuit flow occurs from 0.5 R–C second to 2.0 R–C seconds, the designer employs tube A at 400 volt anode potential as indicated by the dotted line 128 and uses a gap means having a striking voltage represented by the position of the dotted line 129 relative to the line $E_2$. Since tube A requires a positive grid bias, care must be taken that the positive grid bias voltage represented by the distance between lines $E_2$ and 128 does not cause appreciable grid current. If prohibitive grid current is present a higher plate voltage should be applied to the anode of tube A to lower the required cut-off bias and another $E_1$ curve used to provide the proper timing.

In using tube A of Figs. 11 and 12 with the circuit of Fig. 10, there is another consideration to take into account. In Fig. 10 the grid of electronic tube 57 is isolated from the timing circuit by the conduction of plate current. This isolation places zero grid bias on the tube 57. Since the cut-off bias of tube A was assumed to be positive, the bias is decreased by isolating the grid. Thus, the lower (zero) bias may cut off the plate current flow in the tube 57. This would cause the relay 56 to open and close intermittently making the timing cycle unreliable.

The simplest solution is to select tube A with a characteristic such that zero grid bias will not cause the plate current to be cut off even though a positive bias is necessary to initiate plate current flow. Many electronic tubes have this characteristic, as for example cold cathode tubes and Thyratrons, of which tubes OA4G and GL5560/FG95 are illustrative. Another solution is to provide an auxiliary biasing circuit connected from the grid to the cathode of tube 57 and controlled by relay 55. This auxiliary biasing circuit needs only a battery to provide a sufficient positive bias and a switch to be closed by the actuation of relay 55. Thus, when the grid is isolated from the timing circuit, by the energization of relay 55, the auxiliary biasing circuit would be closed to insure continuation of plate current flow.

The purpose of Fig. 13 is to suggest how much the same approach may be made in designing a timing circuit for control of a vacuum tube. Thus if it is desirable to have the plate current of the tube initiated at a given intermediate point in the time cycle, the designer may plot a family of plate curves for a selected vacuum tube as shown on the left of Fig. 13 and on the right may plot selected $E_1$ curves.

For example, suppose the problem is to start current flow in the plate circuit at 2.5 R–C seconds and to terminate the current flow at 5.0 R–C seconds. Curve $E_1'$ would be selected to determine the manner in which the grid voltage would progressively rise and to determine the point in the time cycle at which current flow would start. In Fig. 13 the dotted line 130 across the origin of curve $E_p^3$ cuts the curve $E_1$ at the desired point in the time cycle and the dotted line 131 cuts the curve $E_1$ at a point indicating the required striking voltage for the gap means in the time circuit.

It will be apparent that if it is required that flow through the plate circuit start at the very beginning of the time cycle, the designer may resort to a simplex circuit. As indicated heretofore in Fig. 12, the $E_1$ curve for a simplex circuit for starting a time cycle always originates at the value of $E_2$.

One important advantage of our invention which may be understood by referring to Figs. 11, 12 and 13 is that a timing circuit may be operatively associated with a plurality of tubes for predetermined sequential control of the tubes. In Fig. 11, for example, a control circuit represented by a timing curve $E_1$ may be used to trigger gaseous tubes C, B, and A in succession. Again in Fig. 13 a timing circuit represented by the curve $E_1$ may be used to initiate current flow in succession in a series of vacuum tubes having plate voltages $E_p^1$, $E_p^2$ and $E_p^3$.

Fig. 14 shows, by way of example, how our timing circuit may be operatively associated with two electronic tubes, which tubes may be either vacuum tubes or gaseous tubes. The arrangement is shown, by way of example, as adapted for the operation of three relays 132, 133 and 134 in predetermined time sequence.

The timing circuit in Fig. 14 includes a voltage divider 135 across a battery to provide a first electromotive force, a timing condenser 137 to provide the required opposing electromotive force, the usual switch-controlled resistance 138, a gap means 140 and the energizing coil 141 of the relay 134. The timing condenser may be charged through a pair of charging contacts 142.

The grids of both a first electronic tube 143 and a second electronic tube 144 are connected to the timing circuit between the timing condenser 137 and a gap means 140 so that the grid voltages of both tubes rise progressively in the initial portion of the time cycle. Tube 143 may be, for example, tube C in Fig. 11 and tube 144 may be tube B, so that the timing circuit operating in accord with curve $E_1$ in Fig. 11 will cause the two tubes to be triggered in succession. The coil 145 for energizing relay 132 is shown in the cathode circuit of tube 143 and the coil 156 for the relay 133 is shown in the cathode circuit of tube 144.

The manner in which the arrangement in Fig. 14 operates is readily understood, it being similar to Fig. 4. In the initial part of the timing cycle in which the voltage difference across the gap means 140 is progressively decreasing, the grid voltages of the tubes 143 and 144 progressively rise to trigger tube 143 and 144 in succession, thereby operating relays 132 and 133 in succession. After the voltage differential has reached a predetermined value, current in the timing circuit flows through the gap means 140 to energize relay 134. Relay 134 may be employed to open the plate circuits of the tubes 143 and 144 if desired.

Fig. 15 shows an arrangement in which a vacuum tube 150 is controlled by a time circuit and in turn controls two electronic tubes 151 and 152 successively. Tubes 151 and 152 may be either vacuum tubes or gaseous tubes. The timing circuit in Fig. 15 is largely similar to Fig. 14, as indicated by corresponding numbers for corresponding parts, but the coil 153 in the timing circuit is part of a relay having two armatures 155 and 156. When the relay is energized by current flow through the timing circuit armature 155 opens the plate circuit of the vacuum tube 150 and armature 156 opens the plate circuits of both tubes 151 and 152.

The grid of tube 151 is connected to a contact 157 adjustable along a resistance 158 and the grid of the tube 152 is connected to a second contact 160 that is likewise adjustable along the resistance 158. In the absence of current flow through the plate circuit of the vacuum tube 150, the grids of the tubes 151 and 152 are given sufficient negative bias by a battery 161 to prevent current flow through their plate circuits.

Whenever current flow through the plate circuit of the vacuum tube 150 is initiated by the timing circuit, the potential drop across the resistance 158 counteracts the grid-battery potential to cause current flow in the plate circuits of the tubes 151 and 152 to be initiated in succession. Energization of the relay coil 153 to terminate the time cycle breaks the plate circuit of the vacuum tube 150 thereby to restore the original negative grid bias of the tubes 151 and 152 and also cuts off current flow through the plate circuits of the tubes 151 and 152.

It will be readily understood by those skilled in the art that various reversals can be made in our timing circuit. In Figs. 4, 10, 14 and 15 the arrangement is such that the grid has direct electrical communication with the timing condenser rather than direct communication with the means providing the electromotive force that is opposed by the timing condenser (as in Fig. 1). If desired, however, the grid may have direct electrical communication with the tank condenser or other means for providing the electromotive force that is opposed by the timing condenser charge. This connection would, of course, eliminate the two-interval effect but it would also eliminate the necessity of considering grid current flow.

Figure 16:
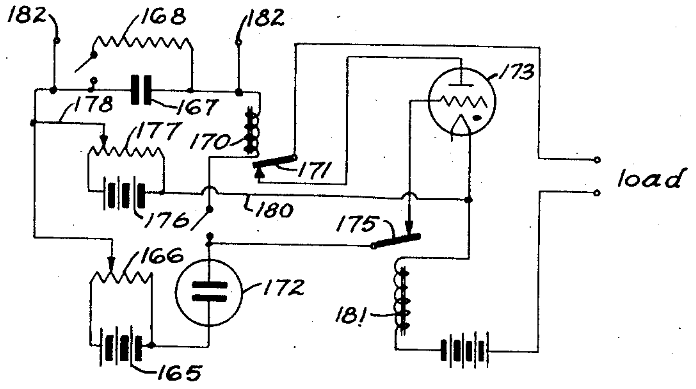

Fig. 16 indicates how in operatively associating a timing circuit with an electronic tube a third electromotive force may be introduced to provide increased flexibility in creating timing cycles. This particular circuit includes a battery 165 shunted by a voltage divider 166 and a timing condenser 167 shunted by a switch-controlled resistance 168, the negative sides of the battery and the condenser being interconnected by a coil 170 of a relay 171 in series with a gap means 172. The grid of an electronic tube 173 is connected through a relay 175 to one side of the gap means 172 as shown in the drawing.

The third electromotive force involved in the operation of the relay circuit is provided by a battery 176 with a voltage divider 177. The positive side of the voltage divider 177 is connected by a wire 178 to the positive sides of the voltage divider 166 and of the timing condenser 167, while the negative side of the voltage divider 177 is connected by a wire 180 to the cathode of the tube 173. The plate circuit of the tube includes a coil 181 of the relay 175.

In the arrangement shown in Fig. 16 the manner in which the grid voltage of the tube responds to progressive discharge of the timing condenser 167 is determined primarily by the electromotive force from the voltage divider 177. The voltage divider 177 may be adjusted, then, to vary the point in the time cycle at which the grid triggers the tube and such adjustment may be made substantially independently of adjustment on the part of the voltage divider 166. The voltage divider 166 determines the manner in which potential difference is built up across the gap means 172 in response to discharge of the timing condenser 167 and may be adjusted independently to vary the length of the timing cycle. It is to be noted that the charge on the timing condenser 167 is in opposition to the electromotive forces provided by both the voltage dividers 166 and 177.

The arrangement in Fig. 16 is designed primarily for control of a gaseous tube but may be applied to the control of any type of tube. After the timing condenser 167 has been charged through the medium of charging contacts 182, the shunt across the timing condenser may be closed to initiate a time cycle. The progressive discharge of the condenser 167 permits the potential of the grid to rise at a rate varying with adjustment of the voltage divider 177 and permits the potential difference across the gap means 172 to rise to a predetermined magnitude at a rate varying with the setting of the voltage divider 166.

Figure 17:
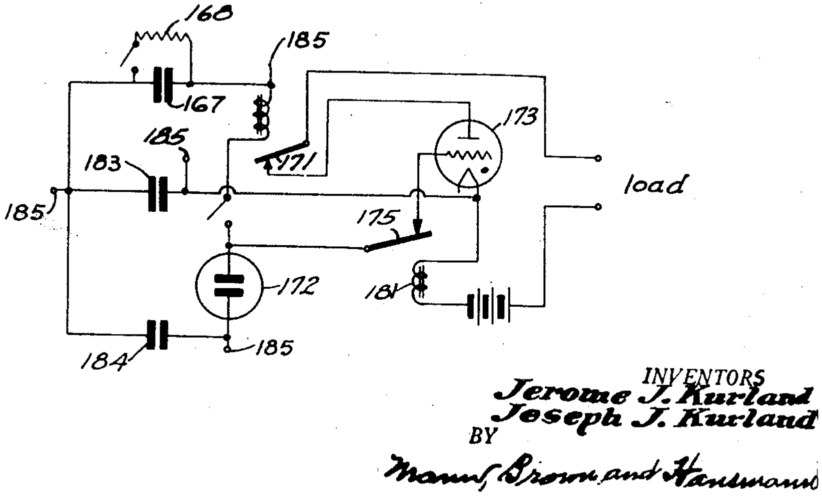

Fig. 17 is similar to Fig. 16, as indicated by the use of corresponding numbers to indicate corresponding parts, but differs in the use of two condensers 183 and 184 to provide the two electromotive forces opposed by the timing condenser 167. The three condensers may be charged through the four charging contacts 185.

In both Figs. 16 and 17 we employed what may be termed a dual, timing circuit having one adjustable means to determine an intermediate point in a time cycle and a second adjustable means to determine the length of the time cycle.

Figure 18:
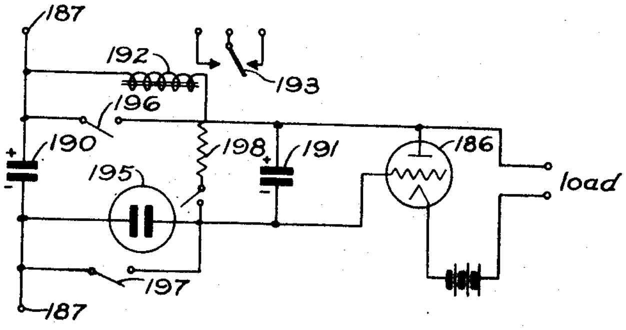

Fig. 18 shows an arrangement illustrating the fact that our timing circuit may be interposed between the grid and plate of a tube 186. This particular arrangement involves a simplex timing circuit which may be charged through two contacts 187. The timing circuit includes a tank condenser 190 and a timing condenser 191 with the coil 192 of a relay 193 connected between the positive side of the two condensers and a gap means 195 connected between the negative sides of the condensers. The grid of the tube 186 is connected to the negative side of the timing condenser 191.

Since it may be desirable to avoid current flow across the gap means 195 and current flow through the relay coil 192 in the course of charging condensers, we provide a charging shunt across the relay coil 192 controlled by a normally open switch 196 and provide a shunt across the gap means 195 controlled by a normally open switch 197. These two switches are closed temporarily for charging the two condensers and are then opened in preparation for a time cycle.

The timing condenser 191 is shunted by the usual switch controlled resistance 198 which may or may not be controlled by a switch as shown. When the timing condenser 191 is progressively discharged through the resistance 198, the potential of the grid progressively rises to eventually initiate flow in the plate circuit of the tube and subsequently current jumps across the gap means 195 to energize the relay coil 192.

Figure 19:
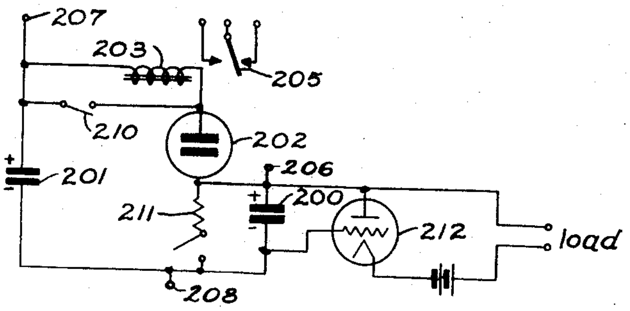

Fig. 19 is similar to Fig. 18 but involves the use of a duplex timing circuit instead of a simplex timing circuit. Interposed between the positive side of a timing condenser 200 and a tank condenser 201 are gap means 202 and the energizing coil 203 of a relay 205. The positive side of the timing condenser 200 is connected to a charging contact 206, the positive side of the tank condenser 201 is connected to a charging contact 207 and the negative sides of the two condensers are connected to a third contact 208. To prevent operation of the relay 205 in the course of a charging procedure, the relay coil 203 may be provided with a shunt having a normally open switch 210. The timing condenser is shunted by the usual switch-controlled resistance 211 and is connected on its negative side to the grid of a tube 212 as shown. The operation of the timing circuit may be readily understood.

Figure 20:
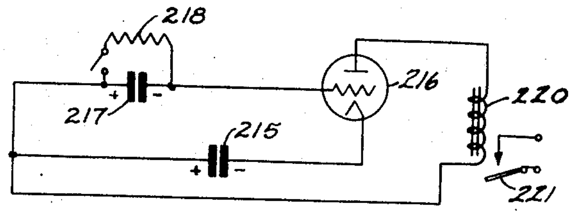

Fig. 20 shows how our combination of a timing circuit and an electronic tube may be reduced to utmost simplicity for certain purposes in which only a momentary surge of current is required in a plate circuit of the tube. A feature of this particular arrangement is the conception of employing a tank condenser for the dual function of both cooperation in the timing function and of providing the electromotive force for current flow through the plate circuit of the tube.

In Fig. 20 the negative side of a tank condenser 215 is connected to the cathode of a tube 216 and the negative side of a timing condenser 217 is connected to the grid of the tube. The timing condenser 217 is shunted by a usual switch-controlled resistance 218. The positive sides of the two condensers are connected together and are connected to one side of the coil 220 of a relay 221, the other side of the coil being connected to the plate of the tube.

When the particular time cycle of the arrangement in Fig. 20 is initiated by closing the shunt path around the timing condenser 217, the grid voltage of the tube rises progressively to a minimum voltage for current flow through the plate circuit whereupon the tank condenser 215 discharges through the plate circuit and thereby momentarily energizes the relay 221.

In the arrangement shown in Fig. 21 a light-sensitive means in the form of a photoelectric cell 226 is employed for shunting a timing condenser 227 through a resistance 228 when the cell is illuminated. The positive side of the timing condenser 227 is connected to the positive side of a tank condenser 230 and the negative sides of the two condensers are interconnected by a gap means 231 and a resistance 232.

In preparation for a timing cycle, the two condensers 227 and 230 are charged with the photo-sensitive cell 226 shielded from light. To start the timing cycle it is necessary to illuminate the photoelectric cell by a varying or constant light intensity whereupon the progressive discharge of the timing condenser 227 is initiated to build up an increasing potential difference across the gap means 231. Eventually current jumps across the gap means to flow through the resistance 232 and thereby counteract the grid-biasing effect of a grid battery 234 on the grid of an electronic tube 233 connected to the timing circuit between the gap means 231 and the resistance 232. Current thereupon flows through the plate circuit of the tube.

Fig. 22 shows an arrangement including a timing condenser 235, a tank condenser 236 and a third condenser 237 to energize the plate circuit of a tube 238. The timing condenser 235 is shunted by resistance 240 controlled by a photoelectric cell 241 and is connected on its negative side to the grid of a tube 238. The positive side of the timing condenser 235 is connected to the positive side of the tank condenser 236 and the negative side of the tank condenser is connected in turn to the cathode of the tube 238. The plate circuit of the tube may have the function of momentarily energizing a relay 242 and for that purpose may include a suitable resistance 243 and the coil 245 of the relay 242. The arrangement shown in Fig. 22, like the arrangement shown in Fig. 21, will not function until the photoelectric cell is illuminated. Illumination of the photoelectric cell initiates the progressive discharge of the timing condenser 235 to start the time cycle.

Fig. 23 shows a simple self-contained arrangement in which no photoelectric cell is required, the purpose of the arrangement being to produce an impulse of current after a preliminary delay period of predetermined duration. A timing condenser 262, which is shunted by a resistance 263, and a tank condenser 265 are both connected on their potential sides to a charging contact 266. The negative sides of the two condensers are interconnected by a gap means 267 and an element of some electrically responsive device, for example, the coil 268 of a relay 270. The negative side of the timing condenser 262 is connected to a charging contact 271 and the negative side of the tank condenser 265 is connected to a second charging contact 272.

After the two condensers are charged by a battery 273, the switches shown may be opened to isolate the described circuit. In some practices of the invention, as heretofore mentioned, initiation of a timing cycle may be achieved simply by moving bodily either the timing circuit or the complementary charging means to isolate the circuit to permit initiation of discharge of the timing condenser through the resistance 263. In due course of time the potential difference across the gap means 267 progressively increases until current jumps across the gap means to energize the relay 270.

Fig. 24 is a circuit similar, for the most part, to Fig. 23 as indicated by the use of corresponding numerals to designate corresponding parts. The one difference is that Fig. 24 includes a photoelectric cell 290 instead of some type of gaseous tube to serve as a gap means. The manner in which a photoelectric cell may serve as a gap means has been explained heretofore. The fact that the circuit in Fig. 24 will not be operative to energize the coil 268 unless the cell 290 is illuminated makes the circuit useful for performing various functions where the presence or absence of light or the intensity of light is a consideration.

Fig. 25 shows a combination of the circuits previously noted in Figs. 23 and 24, the purpose of the dual circuit being to cause two tank condensers to become effective in succession for creating impulses of current.

In Fig. 25 a timing condenser 291 shunted by the usual resistance 292 initially opposes a charge on a first tank condenser 294 and a charge on a second tank condenser 295, the potential sides of the three condensers being interconnected. The first timing circuit includes a gap means in the form of a photoelectric cell 296 and the coil 297 of a relay 299, the photoelectric cell and coil being placed in series between the negative side of the timing condenser 291 and the negative side of the tank condenser 294. The second timing circuit is completed by a gap means 300 in the form of a gaseous tube and the coil 301 of a second relay 302, the coil and gap means being in series between the negative side of the timing condenser and the negative side of the second tank condenser 295.

When the charge on the timing condenser 291 progressively decreases by reason of current flow through the shunt resistance 292, the potential difference across the photoelectric cell 296 and the potential difference across the gaseous tube 300 both increase concurrently. At predetermined points in the time cycle, current flows across the two gap means in sequence. The first relay, of course, will not operate unless the photoelectric cell 296 is illuminated to a minimum degree.

Since the striking voltage of the photoelectric cell 296 is assumed to be lower than the striking voltage of the gaseous tube 300, the photoelectric cell 296 will break down and conduct current first. This break-down electrically between tank condenser 294 and the timing condenser 291 will tend to raise the voltage across the timing condenser and momentarily interrupt the decrease in the timing condenser voltage, but the decrease will be resumed almost instantaneously. The effect of this tendency with relation to the firing of gaseous tube 300 can readily be taken into account in the calibration of the circuit.

In Fig. 26 we illustrate a timing circuit of utmost simplicity in which a photoelectric tube or cell functions as switch means to initiate the time cycle in a manner heretofore explained. The figure shows a voltage divider 304 across a battery connected on its positive side to the potential side of a timing condenser 295, the timing condenser being shunted by a resistance 306 in series with a photoelectric tube or cell 307.

The timing circuit is completed by a gap means 309 and a coil 310 of a relay 311, the gap means and coil being placed in series to interconnect the negative sides of the battery and condenser. The described circuit with the timing condenser charged will be dormant so long as the photoelectric cell 311 is not illuminated to the minimum degree required for current flow therethrough. As soon as the photoelectric cell is illuminated to the required degree, progressive discharge of the condenser 295 occurs with consequent increase in the potential difference across the gap means 309 and eventually current jumps the gap means to energize the coil 310.

In one method of operation by the arrangement in Fig. 26, a photosensitive tube permits the condenser to discharge and thus gives a time delay resulting directly from the intensity of the light falling on the tube.

In another method of operation the timing condenser is partially discharged as a direct function of the quantity of light falling on the photosensitive tube. After the light exposure is terminated without causing current to jump the gap means 303, the voltage divider is progressively shifted towards higher voltage until current does jump the gap. If the voltage divider is calibrated in accord with some selected standard, the critical adjustment of the voltage to cause current flow in the timing circuit will represent some relative measurement of the quantity of light.

Fig. 27 indicates the manner in which the principles of our timing circuit may be employed in a circuit breaker or in any arrangement in which an auxiliary circuit is to respond to changes of current flow of predetermined magnitude in a main D. C. circuit. In Fig. 27, the main circuit is represented by a pair of leads 315 and 316. For our purpose, the lead 316 has a resistance 317 as a portion thereof and is broken by a normally closed relay 318. A variable portion of the resistance 317 may be shunted by virtue of a movable contact connected to one end of the resistance so that the voltage drop along the resistance for a given current of the main circuit may be varied as required for adjustment of the auxiliary circuit.

The auxiliary circuit in Fig. 27 includes the resistance 317 so that the voltage drop across the resistance sets up what may be termed a first electromotive force in the auxiliary circuit. A wire 321 leads from one side of the resistance 317 to one side of a battery or other electromotive means 322. The other side of the battery is connected to the other side of the resistance 317 through a gap means 323 and the coil 325 of the relay 318, the gap means and relay coil being connected in series.

The polarity of the battery 322 with respect to the direction of current flow through the lead 316 is such that the second electromotive force provided by the battery is opposed to the first electromotive force in the auxiliary circuit engendered by the potential drop across the resistance 317. It is apparent that the voltage drop for a given current in the main circuit may be adjusted to approximately balance the electromotive force of the battery 322 or at least to provide a normal potential difference across the gap means 303 insufficient to cause current in the auxiliary circuit to jump the gap means.

If the flow of current through the main circuit drops sufficiently, the electromotive force of the battery will become dominant and cause current to jump the gap means 303 in one direction thereby to energize the relay coil 325 to break the main circuit. It is important to note that conversely if the current flow through the main circuit is increased to a predetermined extent the voltage drop across the resistance 317 will become dominant and cause current flow in the opposite direction across the gap means 303 likewise to open the relay 318. The auxiliary circuit then responds to a predetermined differential between an electromotive force provided by the main circuit and an electromotive force provided within the auxiliary circuit which differential may be in either direction. The basic arrangement shown in Fig. 27 may be employed in the operation of numerous devices including, for example, plating tanks, control baths, motors, heating elements, electric fuses, etc.

Fig. 28 illustrates how a photoelectric cell can be used as a gap means in a timing circuit associated with an electronic tube. Fig. 28 shows a curve 326 representing current flow between the anode and cathode vs. the voltage across the anode to cathode of a photoelectric cell, when the photoelectric cell is illuminated to a given degree. The horizontal line 327 is the familiar reference line based on the relative values of $E_2$ and $E_1$, and $E_1$ is the familiar voltage decay curve of the typical timing circuit. It will be noted in Fig. 28 that for the given level of illumination current does not flow through the photoelectric tube until the value of $E_1$ falls below the value of $E_2$.

Fig. 29 shows a circuit similar to that of Fig. 10 except that a photoelectric cell has been used as a gap means, a variable resistance has been added in series with the gap means, and a self-opening (stick) relay has been used in place of a manual switch to shunt the resistance across the timing condenser. Reference characters corresponding to those of Fig. 10 have been used in Fig. 29 to designate corresponding parts.

The operation of the circuit shown in Fig. 29 is the same as the operation previously explained for the circuit of Fig. 10 until the timing cycle is to be terminated. The operation of the circuit of Fig. 29 can be more readily understood by referring to Fig. 28.

The timing condenser 62 is initially charged to a value depicted by the lower end of the $E_1$ curve in Fig. 28, and tank condenser 60 is charged to a value represented by the line 327. It should be understood that the vertical voltage scale of Fig. 28 is inverted so that the higher voltages are at the bottom.

After removing the charging means the timing cycle is initiated by manually closing the contacts of the self-opening relay 70. This self-opening relay 70 is a relay which will hold the contacts in its own exciting circuit closed, whenever the current in the exciting circuit is above a predetermined minimum value, and open the contacts and retain them open, whenever the current falls below this minimum value. The current flowing through the self-opening relay 70 and the resistance 68 is a function of the voltage $E_1$ across the timing condenser 62, and if plotted against time the curve would be similar to the curve of $E_1$ of Fig. 28. Thus, the current through the relay 70 starts at a high value and decays exponentially toward zero in the same manner that the voltage $E_1$ decays toward zero. For a constant value of resistance 68 the current flowing through the resistance 68 and the self-opening relay 70 is directly proportional to the voltage $E_1$. Therefore, by adjusting the self-opening relay 70 to actuate at any given current value, the value of $E_1$, at which time relay 70 actuates, is also fixed.

In Fig. 28 the value of $E_1$, at which the self-opening relay 70 opens, is depicted by the intersection of the $E_1$ curve and the horizontal line 328.

After removing the charging means and closing the self-opening relay 70, the timing condenser voltage then decreases in value along the $E_1$ curve. When this voltage reaches a value represented by the line 329, the electronic tube 57 has applied to its grid a negative bias voltage equal to the voltage value of the dimension 330. This value of voltage is the cut-off bias of the electronic tube 57. Hence, current will begin to flow in the plate circuit of the electronic tube 57 actuating the relay 55. The actuation of relay 55 isolates the grid by opening the lead connecting the grid of tube 57 to the timing circuit.

As the voltage $E_1$ continues to decrease it will eventually fall below the voltage value on the tank condenser. The voltage applied across the photocell gap means 65 will then be of the correct polarity to cause current flow through the photocell gap means if the cell is illuminated, but the relay 58 requires a certain magnitude of current to flow through the coil 59 before the relay will operate. This minimum current for the particular level of illumination illustrated by curve 326 is depicted in Fig. 28 by the dimension 331. The value of $E_1$ required to give this minimum photocell current is represented by the intersection of the horizontal line 332 and the $E_1$ curve.

If the photocell gap means 65 is illuminated to the level depicted by curve 326, when the timing condenser voltage $E_1$ reaches the value necessary for the minimum photocell current, the timing cycle will be terminated by the actuation of relay 58. If the photocell gap means 65 is not sufficiently illuminated to cause relay 58 to operate before the timing condenser voltage $E_1$ reaches the value depicted by the intersection of the $E_1$ curve and the horizontal line 328, the self-opening relay 70 will open causing the timing condenser voltage to no longer decrease, but remain a constant value. This action maintains a constant voltage represented by the dimension 333 across the photocell gap means 65. This constant voltage remains across the photocell gap means 65 until the photocell is illuminated to the required level to actuate relay 58. Thus, after the timing condenser voltage $E_1$ has fallen below the value necessary to provide the minimum current to actuate relay 58, the timing cycle can be terminated at any time by illuminating the photocell gap means 65 to the level indicated by curve 326.

Since the variable resistance 334 is in series with the photocell gap means 65 and the relay 58, the value of this resistance will determine the amount of current flowing through this series circuit. Thus, the variable resistance 334 provides a means for correlating the timing condenser voltage $E_1$ and the minimum current necessary to actuate relay 58 for a given level of illumination. If, as an example, for a given voltage differential between $E_1$ and $E_2$, the current flowing through relay 58, photocell gap means 65, and resistance 334 is too small to actuate relay 58, the resistance 334 can be reduced in value to permit sufficient current flow to actuate the relay 58.

If the photocell is illuminated, Fig. 28 shows that the photoelectric current through the photocell gap means 65 begins as soon as the timing condenser voltage $E_1$ falls below the tank condenser voltage $E_2$. This current flow tends to reduce the voltage differential impressed across the gap means, thereby, upsetting the timing. If this photoelectric current is appreciable, it would upset the timing, but if certain photocells are used in this circuit, such as the R. C. A. types 925, 926 and 929, the minimum photocell gap means current to operate the relay 58 can be in the neighborhood of from 1 to 7 microamperes. The effect of this small current can be ignored when reasonably large timing and tank condensers are used since the voltage differential will be negligibly affected.

If, after the timing condenser voltage $E_1$ falls below the tank voltage, a sufficiently high value of illumination is directed onto the photocell gap means 65 the gap means will conduct current of a magnitude capable of actuating the relay 58. This operation will, of course, be dependent upon the value of resistance 334. If insufficient illumination is directed onto the photocell gap means 65 the gap means will not conduct sufficient current to operate the relay 58 until the illumination level is raised to at least the minimum value. If the timing cycle has not been terminated before $E_1$ reaches the value necessary to operate the self-opening relay 70 the timing circuit will remain in a static state until the proper level of illumination is directed onto the photocell gap means 65. The circuit will not remain in this static state over an indefinite period when the photocell gap means 65 is illuminated to a level lower than the minimum value, since the photocell would be conducting a small current and thereby slowly decreasing the voltage across the gap means.

Fig. 30 illustrates the characteristics of another gap means which may be used in circuits such as Figs. 4, 14 and 15, wherein the timing condenser is at all times electrically connected to the grid and the possibility of unwanted grid current can exist. The curve of Fig. 30 represents the current vs. voltage characteristic of a germanium crystal diode, which is well known in the art as being a unidirectional conductor of electric current, having a low forward resistance, and therefore admirably suited for use as the gap means in the timing circuit. The horizontal line 335 represents the voltage scale, and the vertical line 336 represents the current scale. The back voltage is represented by the horizontal line to the left of line 336 while the forward voltage is represented by the horizontal line to the right of line 336. The back current is represented by the vertical line below line 335 while the front or forward current is represented by the vertical line above the line 335. From this characteristic curve it will readily be seen that this crystal diode is obviously well suited for use as a gap means. In using a gap means such as this, the designer should be particularly careful not to use a gap means wherein the back current is appreciable since this back current will act to upset the theoretical time values.

In circuits such as those of Figs. 10, 16, 17, the only possibility of any adverse grid current is when the electronic tube, which the timing circuit controls, requires a positive bias to initiate plate current flow. The simplest way to eliminate this effect is to operate the electronic tube with the positive cutoff bias at a sufficiently low value to preclude any appreciable grid current flow. Another obvious way to offset the effect of grid current is to provide a very high resistance in the lead connecting the grid of the electronic tube to the timing circuit. This latter expedient is also applicable to the circuits such as those of Figs. 4, 14, 15 and 28, and can appreciably extend the amount of positive grid bias that can be applied to the electronic tube without the detrimental effect of grid current.

We have not attempted to point out the various specific applications of our circuits that may be made for various purposes in various fields since the various applications of the circuits will be obvious to skilled persons. The numerous embodiments of our invention, set forth above, in more or less specific detail for the purpose of disclosure and to illustrate the principles involved, will suggest to those skilled in the art various changes and substitutions under our basic concepts; we reserve the right to all such departures from our description that lie within the scope of our appended claims.

We claim:

1. A timing circuit comprising an electronic tube having cathode plate and grid elements, a relatively stable source of direct current potential, an electrical device adapted to be provided with an electric charge, means to reduce said electric charge at a predetermined rate, and gap means having a predetermined minimum voltage requirement for conduction therethrough and connected in a series circuit with said source and said electrical device, with said source and electrical device connected in series opposition through the gap means whereby said electrical device opposes in polarity said stable source of direct current potential to limit current flow through said gap means until a predetermined reduction in said electric charge has been effected by operation of said charge reducing means, and means connecting said series circuit to the grid of said electronic tube.

2. A means for controlling current flow in the plate circuit of a grid-controlled electronic tube comprising; a timing circuit connected with the grid of said tube, means providing a first unchanging electromotive force in said timing circuit tending to produce current flow in said plate circuit by shifting the grid voltage of said tube in one direction past the minimum grid voltage for current flow in said plate circuit; means providing an electric charge in said timing circuit opposed to said electromotive force and acting independently thereof to initially prevent said shifting of the grid voltage; means to reduce said charge progressively at a predetermined rate thereby to permit said electromotive force to become effective for said shifting of the grid voltage, and gap means to prevent flow of current between the electromotive force means and the electric charge means until said charge is reduced to a predetermined value.

3. Means for controlling the plate circuit of a grid-controlled electronic tube to provide one or more predetermined time delay periods related to current flow through said plate circuit, comprising: a timing circuit; gap means in said timing circuit to prevent current flow therethrough until a predetermined potential difference is developed across the gap means; charging means to produce a predetermined unchanging initial potential distribution in said timing circuit; means to progressively change the potential distribution in said timing circuit thereby to progressively change the potential difference across said gap means until current jumps the gap means; and means connecting the grid of said tube with said timing circuit to cause the grid voltage to shift past minimum voltage for plate-circuit flow in response to said progressive change in potential distribution in said circuit.

4. Means for controlling the plate circuit of a grid-controlled electronic tube with predetermined time delay, comprising: a control circuit; means in said control circuit for providing a first electromotive force; a condenser in said circuit for providing an independent, opposed electromotive force; a resistance continuously shunting said condenser; charging means for communication with said condenser to maintain a charge of initial value thereon with current flowing through said shunting resistance, whereby cutting off the charging means initiates a time period in which said charge progressively decreases from said initial value; gap means in said control circuit in series with said electromotive means and said condenser whereby progressive decrease in the condenser charge progressively builds up a potential difference across the gap means, said gap means being constructed and arranged to pass current when said potential difference reaches a predetermined value; and means connecting said circuit with the grid of said tube to cause the grid voltage to swing past the minimum voltage for plate-current flow in response to said progressive increase in potential difference across said gap means.

5. Means for controlling current flow in a first circuit and a second circuit with different predetermined delays, comprising: a grid-controlled electronic tube having said first circuit connected thereto as a plate circuit; current-blocking means in said second circuit normally to prevent current flow therethrough, said blocking means being constructed and arranged to permit flow in response to a predetermined potential across the blocking means; means providing an electromotive force in said second circuit on one side of said blocking means, said second circuit being connected on the other side of said blocking means with the grid of said tube; a condenser in said second circuit between said electromotive means and the connection with said grid to hold a charge opposed to said electromotive force thereby to initially prevent current flow in said first and second circuits; and means to discharge said condenser progressively to initiate a time cycle and to permit said electromotive force first to shift the voltage of said grid to a minimum value to initiate current flow in the first circuit and subsequently to build up said predetermined potential drop across said blocking means to cause current flow in said second circuit.

6. A combination as set forth in claim 3 in which the grid of said tube is connected with said timing circuit on one side of said gap means to cause the grid voltage to shift past said minimum voltage prior to current flow across said gap means.

7. A timing circuit comprising an electronic tube having cathode plate and grid elements, a relatively stable source of direct current potential, an electrical device provided with an electric charge, means to reduce said electric charge at a predetermined rate, and gap means having a predetermined minimum voltage requirement for conduction therethrough and connected in a series circuit with said source and said electrical device, with said source and electrical device connected in series opposition whereby said electrical device opposes in polarity said stable source of direct current potential to limit current flow through said gap means until a predetermined reduction in said electric charge has been effected by operation of said charge reducing means, and means connecting the grid of said electronic tube to the series circuit at a point intermediate said electrical device and said gap means and adapted to produce conduction in said tube whenever said charge has been reduced to a predetermined value.

8. A timing circuit comprising an electronic tube having cathode plate and grid elements, a relatively stable source of direct current potential, an electrical device provided with an electric charge, means to reduce said electric charge at a predetermined rate, and gap means having a predetermined minimum voltage requirement for conduction therethrough and connected in a series circuit with said source and said electrical device, with said source and electrical device connected in series opposition whereby said electrical device opposes in polarity said stable source of direct current potential to limit current flow through said gap means until a predetermined reduction in said electric charge has been effected by operation of said charge reducing means, and means connecting the grid of said electronic tube to the series circuit at a point intermediate said electrical device and said gap means and adapted to produce conduction in said tube whenever said charge has been reduced to a predetermined value, and to produce conduction in said gap means whenever the charge is further reduced to some lower predetermined value.

9. A combination as set forth in claim 3 in which the grid of said tube is connected with said timing circuit on one side of said gap means to cause the grid voltage to shift past said minimum voltage in response to current flow across said gap means.

10. Means for starting current flow through a given circuit with predetermined time delay comprising; a grid-controlled electronic tube having its anode and cathode in said given circuit for control of current therethrough; a control circuit connected with the grid of said tube; a first resistance in said control circuit to provide a potential difference in response to current flow in one direction therethrough thereby to shift the grid voltage of said tube in one direction past the minimum grid voltage for current flow in said given circuit; means in said control circuit providing an electromotive force tending to cause current flow through said resistance in said one direction; a condenser in said circuit to hold an independent opposing charge to hold such current flow in abeyance; a second resistance shunting said condenser to reduce said opposing charge progressively at a predetermined rate; and gap means in said circuit to prevent current flow through said first resistance until a predetermined potential difference is established across the gap means, said first resistance, said means providing an electromotive force, said condenser and said gap means all being series connected in said control circuit.

11. Means for actuating a first electrically responsive means and a second electrically responsive means with different predetermined time delays comprising: a first circuit operatively connected to said first responsive means; a grid-controlled electronic tube having its anode and cathode in said first circuit for control of current flow therethrough; a second circuit operatively connected with said second responsive means, said second circuit being connected to the grid of said tube; a first resistance in said second circuit to provide a potential difference in response to current flow in one direction through the second circuit thereby to shift the grid voltage of said tube in one direction past the minimum grid voltage for current flow in said first circuit; means in said second circuit providing an electromotive force tending to cause current flow through said first resistance in said one direction; a condenser in said second circuit to hold an opposing charge to initially prevent such current flow; a second resistance shunting said condenser in said second circuit to reduce said opposing charge progressively at a predetermined rate; and gap means in said second circuit to prevent current flow therethrough until a predetermined potential difference is established across the gap means, said first resistance, said means providing an electromotive force, said condenser and said gap means all being series connected in said second circuit.

12. A timing circuit for controlling current flow in the plate circuit of a grid controlled electronic tube, said circuit comprising a source of direct current potential, an electrical device adapted to be provided with an electric charge, a gap means, a resistor, said source, electrical device, gap means and resistor all being connected in a series circuit, means for reducing the charge on the electrical device at a predetermined rate, and means for connecting the grid of said electronic tube to said series circuit between said gap means and resistor, whereby initiating the reduction in the electric charge on said electrical device by operation of said charge reducing means starts a time period, which time period is terminated by conduction of said gap means, thereby causing current flow in said plate circuit.

13. Means for starting and stopping current flow in a given circuit in predetermined time sequence comprising: a grid-controlled electronic tube having its anode and cathode in said given circuit for control of current flow therethrough; a normally closed switch in said given circuit for separate control of current flow therethrough; a control circuit connected with the grid of said tube; an actuating means responsive to current flow through said control circuit to open said switch; means in said control circuit providing an electromotive force tending to raise the potential of said grid to cause current flow through said given circuit; capacity means in said control circuit to hold an opposing charge to initially make said electromotive force ineffective; means including a resistance shunting said capacity means to decrease said opposing charge progressively at a predetermined rate; and gap means in said control circuit to prevent current flow therethrough until a predetermined potential difference is established across the gap means whereby the gap means delays actuation of said actuating means until after current flow is initiated in said given circuit by a rise of the grid voltage of the tube.

14. Means for starting and stopping current in a given circuit in predetermined time sequence comprising: a grid-controlled electronic tube having its anode and cathode in said given circuit for control of current flow therethrough; a first normally closed switch in said given circuit for separate control of current therethrough; a control circuit; a second normally closed switch to connect said control circuit with the grid of said tube; a first actuating means responsive to current flow through said control circuit to open said first switch; a second actuating means responsive to current flow through said given circuit to open said second switch; means in said control circuit providing an electromotive force effective to cause current flow through the control circuit and effective to shift the grid voltage of said tube in one direction for current flow in said given circuit; capacity means in said control circuit to hold an opposing charge to initially make said electromotive force ineffective; shunt means including a resistance to progressively discharge said capacity means thereby to progressively decrease opposition to said electromotive force; and gap means in said control circuit to prevent current flow therethrough until a predetermined potential difference is established across the gap means by progressive discharge of said capacity means, whereby said first responsive means is actuated after initiation of current flow in said given circuit.

15. Means for actuating three electrically responsive means at predetermined points in a time cycle comprising: a first grid-controlled electronic tube having its plate circuit operatively connected with one of said responsive means; a second grid-controlled electronic tube having its plate circuit operatively connected with a second of said responsive means; a control circuit operatively connected with the third of said responsive means; means in said control circuit providing an electromotive force tending to cause current flow therethrough; capacity means in said control circuit to hold an opposing charge to initially make said electromotive force ineffective; means for progressively decreasing said opposing charge; gap means in said control circuit to prevent current flow therethrough until a predetermined potential difference is established across the gap means by progressive decrease of said opposing charge; and means connecting said control circuit to the grids of said two tubes to cause the grid voltages of the two tubes successively to reach the minimum grid voltages for current flow through the plate circuits of the tubes, said gap means being designed to delay current flow in said control circuit until said minimum grid voltages are reached in both said tubes.

16. Means for controlling the plate circuit of a grid-controlled electronic tube with a predetermined time delay period comprising: a control circuit connected to the grid of said tube; means providing an electromotive force in said control circuit effective to shift the grid voltage of said tube in one direction to the minimum grid voltage for current flow through said plate circuit; capacity means in said control circuit to hold an opposing charge to initially make said electromotive force ineffective; a normally open shunt across said capacity means including a resistance for progressive decrease of said opposed charge at a predetermined rate; and light-responsive means to close said normally open shunt thereby to initiate a time delay period which is terminated by current flow through said plate circuit.

17. Means for controlling the plate circuit of a grid-controlled electronic tube with predetermined time delay comprising: a control circuit connected to the grid of said tube; means to produce in said control circuit an electromotive force effective to shift the grid voltage of said tube past the minimum value for current flow through said plate circuit; capacity means in said control circuit to hold an opposing charge to initially make said electromotive force ineffective; photoelectric means in said control circuit providing a gap to prevent current flow therethrough until a predetermined potential difference is established across the gap and to prevent such current flow unless the photoelectric means is energized by light; and means including a resistance to shunt said capacity means to cause said opposing charge to decrease progressively thereby making said electromotive force progressively effective.

18. Means to energize an electrical device with time delay comprising: an electric circuit operatively connected with said device for energization thereof; means in said circuit to provide an electromotive force; capacity means in said circuit to hold a charge opposed to said electromotive force; means to discharge said capacity means progressively at a predetermined rate; and a photoelectric cell having its anode and cathode connected in said circuit to provide a gap in the circuit to prevent current flow through the circuit until a predetermined potential difference is established across the gap and to prevent such current flow unless the photoelectric cell is light-activated.

JEROME J. KURLAND.
JOSEPH J. KURLAND.

References Cited in the file of this patent

UNITED STATES PATENTS

| Number | Name | Date |
|---|---|---|
| 1,787,299 | Alexanderson | Dec. 30, 1930 |
| 2,108,219 | Swart | Feb. 15, 1938 |
| 2,171,347 | Schneider | Aug. 29, 1939 |
| 2,404,553 | Wales | July 23, 1946 |
| 2,405,182 | Bollman | Aug. 6, 1946 |
| 2,463,318 | Schneider et al. | Mar. 1, 1949 |
| 2,507,226 | Seizen | May 9, 1950 |